(12) United States Patent
Mendoza et al.

(10) Patent No.: US 8,765,873 B2
(45) Date of Patent: Jul. 1, 2014

(54) COMPRESSION BLOW FORMED ARTICLES

(75) Inventors: Rennan A. Mendoza, La Selva Del Camp (ES); Rodolfo Salmang, Terneuzen (NL); Roberto Rigobello, Herrliberg (CH)

(73) Assignee: Braskem America, Inc., Philadelphia, PA (US)

( * ) Notice: Subject to any disclaimer, the term of this patent is extended or adjusted under 35 U.S.C. 154(b) by 59 days.

(21) Appl. No.: 13/340,190

(22) Filed: Dec. 29, 2011

(65) Prior Publication Data

US 2012/0172532 A1    Jul. 5, 2012

Related U.S. Application Data

(60) Provisional application No. 61/428,260, filed on Dec. 30, 2010.

(51) Int. Cl.
*C08F 8/00* (2006.01)
*C08L 23/10* (2006.01)

(52) U.S. Cl.
USPC .......................................... 525/191; 525/240

(58) Field of Classification Search
USPC ................................. 525/191, 240
See application file for complete search history.

(56) References Cited

U.S. PATENT DOCUMENTS

| | | |
|---|---|---|
| 4,814,135 A | 3/1989 | Heitz |
| 4,857,600 A | 8/1989 | Gross et al. |
| 5,076,988 A | 12/1991 | Rifi |
| 5,153,382 A | 10/1992 | Gross et al. |
| 5,504,172 A | 4/1996 | Imuta et al. |
| 6,593,005 B2 | 7/2003 | Tau et al. |
| 6,776,924 B2 | 8/2004 | Walters et al. |
| 6,784,252 B2 * | 8/2004 | Ramanathan et al. ........ 525/240 |
| 6,919,407 B2 | 7/2005 | Tau et al. |
| 7,303,797 B1 | 12/2007 | Barsotti et al. |
| 8,093,335 B2 * | 1/2012 | Jiang et al. .................... 525/191 |
| 8,420,760 B2 * | 4/2013 | Hughes et al. ................ 526/348 |
| 2008/0139717 A1 * | 6/2008 | Brasel et al. .................. 524/380 |
| 2009/0057961 A1 | 3/2009 | McKeeman et al. |

FOREIGN PATENT DOCUMENTS

| | | |
|---|---|---|
| EP | 1 947 143 A1 | 7/2008 |
| WO | WO 00/01745 A1 | 1/2000 |
| WO | WO 2005/077642 A1 | 8/2005 |
| WO | WO 2006/018777 A1 | 2/2006 |
| WO | WO 2006/018812 A1 | 2/2006 |
| WO | WO 2007/117520 A2 | 10/2007 |
| WO | WO 2009/055527 A1 | 4/2009 |
| WO | WO 2009/067337 A1 | 5/2009 |
| WO | WO 2009/085922 A1 | 7/2009 |

OTHER PUBLICATIONS

Ramamurthy, "Wall Slip in Viscous Fluids and Influence of Materials of Construction," Journal of Rheology, 30(2), 337-357 (1986).
Markovich et al., "Gel Permeation Chromatography-Fourier Transform IR Spectroscopy to Characterize Ethylene-Baed Polyolefin Copolymers," ACS Symposium Series: Chromatography of Polymers, 521, 270-276 (1993).
P.J. Deslauriers et al., "Quantifying Short Chain Branching in Ethylene 1-Olefin Copolymers using Size Exclusion Chromatography and Fourier Transform Infrared Spectroscopy," Polymer, 43, 159-170 (2002).
Extended European Search Report, Application No. 1119591.6-2109, Mar. 15, 2012.

\* cited by examiner

*Primary Examiner* — Nathan M Nutter
(74) *Attorney, Agent, or Firm* — Duane Morris LLP

(57) ABSTRACT

The invention provides a compression blow formed article formed from a composition comprising at least the following: 1) a polypropylene homopolymer and 2) a propylene-based polymer.

11 Claims, 1 Drawing Sheet

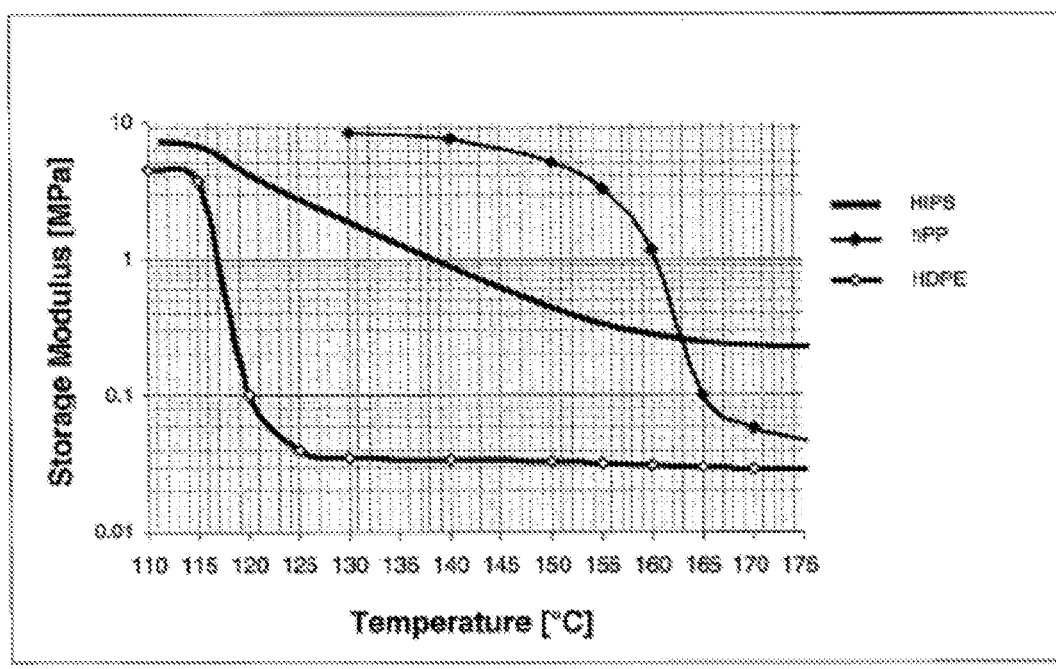

COMPRESSION BLOW FORMED ARTICLES

BACKGROUND

Compression Blow Forming (CBF) is a process for the manufacture of small to medium sized thin walled containers, such as bottles. The CBF processing of propylene-based polymers is very difficult for two main reasons: such polymers are difficult to cut after extrusion to form a particulate (gob), and such polymers are difficult to stretch and blow mold after compression. Thus, there is a need for compression, blow formed articles formed from propylene-based polymers.

International Publication No. WO 2009/055527 discloses a rubber modified monovinylidene aromatic polymer composition, in the form of a stretch blow molded article. The composition comprises the following: (A) a monovinylidene aromatic polymer a having a weight average molecular weight (Mw) from about 190,000 to about 350,000 g/mol; (B) from about 3.5 to about 10 percent, by weight, based on the weight of components (A), (B) and (C), of a grafted, cross-linked rubber polymer; (C) optionally up to about 5 percent, by weight, based on the weight of components (A), (B) and (C) of a plasticizer; and (D) optional non-polymeric additives and stabilizers.

U.S. Publication No. 2009/0057961 discloses a process for producing clear injection stretch blow molded containers, comprising molding a propylene polymer composition comprising the following: (A) a propylene polymer chosen from: (i) a homopolymer or mini-random copolymer of propylene containing up to 1.0 wt % of at least one of ethylene and C4-C10 α-olefins; (ii) a random copolymer of propylene and at least one olefin chosen from ethylene and C4-C10 α-olefins; and (iii) mixtures thereof; and (B) about 1 to about 1000 ppm, based on the weight of the propylene polymer, of at least one radiant heat absorbent; thereby forming a preform; and II. stretch blow molding the preform; and wherein in step 11, heat is supplied by infrared radiation. The containers have a haze value less than 25.0%.

Additional articles and/or compositions are described in U.S. Pat. No. 7,303,797; and International Publication Nos. WO 2009/067337; WO 2007/117520; WO 2009/085922. As discussed, there is a need for compression, blow formed articles formed from propylene-based polymers.

SUMMARY OF INVENTION

The invention provides a compression blow formed article formed from a composition comprising at least the following: 1) a polypropylene homopolymer and 2) a propylene-based polymer.

BRIEF DESCRIPTION OF THE DRAWINGS

FIG. 1 depicts "storage modulus versus temperature" profiles of several polymers.

DETAILED DESCRIPTION

Compression Blow Forming (CBF) is the combination of a continuous compression molding process and a perform blowing process. CBF can be a rotating continuous process in a single molding and blowing unit or a stretch, blowing unit. Polymer resin is inserted into a mold, and formed into a perform by compression. Next, the compression molded perform is optionally stretched. The perform (stretched or unstretched) is then subject to a blow forming process, to form the finished bottle or container. For example, see CBF, Compression Blow Forming, The New Way into Plastic Containers, The Packaging Conference 2009, Las Vegas, Nev.

As discussed above, the invention provides a compression blow formed article formed from a composition comprising at least the following: 1) a polypropylene homopolymer and 2) a propylene-based polymer.

In one embodiment, the polypropylene homopolymer has a melt flow index (MFI) from 0.5 to 10 g/10, or from 1 to 7 g/10 min, or from 2 to 4 g/10 min.

In one embodiment, the polypropylene homopolymer and the propylene-based polymer each, independently, has a molecular weight distribution (Mw/Mn) from 1.5 to 3, or from 2 to 3, as determined by GPC.

In one embodiment, the second propylene-based polymer is selected from the group consisting of the following: A) a random propylene-based interpolymer, and preferably a random propylene-based copolymer; B) a long chain branched propylene-based interpolymer, and preferably a long chain branched propylene-based copolymer; C) an azide coupled propylene-based polymer; and D) an impact modified propylene-based polymer.

In one embodiment, the propylene-based polymer is A) a random propylene-based interpolymer, and preferably a random propylene-based copolymer.

In one embodiment, the random propylene-based interpolymer has a melt flow rate (MFR) from 0.3 to 10 g/10 min, or from 0.5 to 7 g/10 min, or from 1 to 3 g/10 min.

In one embodiment, the random propylene-based interpolymer is present in an amount from 65 to 85 wt %, preferably from 70 to 80 wt %, based on the sum weight of the polypropylene homopolymer and the random propylene-based interpolymer. In a further embodiment, the polypropylene homopolymer (Component 1) is present in an amount from 15 to 35 wt %, preferably from 20 to 30 wt %, based on the sum weight of the polypropylene homopolymer and the random propylene-based interpolymer.

A random propylene-based interpolymer may comprise a combination of two or more embodiments as described herein.

In one embodiment, the propylene-based polymer is B) a long chain branched propylene-based interpolymer, and preferably a long chain branched propylene-based copolymer.

In one embodiment, the long chain branched propylene-based interpolymer has a melt flow rate (MFR) from 0.2 to 5 g/10 min, or from 0.3 to 3 g/10 min.

In one embodiment, the long chain branched propylene-based interpolymer is present in an amount from 10 to 40 wt %, or from 15 to 35 wt %, or from 20 to 30 wt %, based on the sum weight of the polypropylene homopolymer and the long chain branched propylene-based interpolymer.

A long chain branched propylene-based interpolymer may comprise a combination of two or more embodiments as described herein.

In one embodiment, the propylene-based polymer is C) an azide coupled propylene-based polymer.

In on embodiment, the azide coupled propylene-based polymer has a melt flow rate (MFR) from 0.2 to 5 g/10 min, or from 0.3 to 3 g/10 min, or from 1 to 3 g/10 min.

In one embodiment, the azide coupled propylene-based polymer is present in an amount from 5 to 35 wt %, or from 10 to 30 wt %, or from 20 to 30 wt %, based on the sum weight of the polypropylene homopolymer and the azide coupled propylene-based polymer.

An azide coupled propylene-based polymer may comprise a combination of two or more embodiments as described herein.

In one embodiment, the propylene-based polymer is D) an impact modified propylene-based polymer.

In one embodiment, the impact modified propylene-based polymer comprises a majority amount of a polypropylene homopolymer and a minority amount of a ethylene/propylene copolymer.

In one embodiment, the impact modified propylene-based polymer has a melt flow rate (MFR) from 0.3 to 10 g/10 min, or from 0.4 to 7 g/10 min, or from 0.5 to 4 g/10 min.

In one embodiment, the impact modified propylene-based polymer is present in an amount from 10 to 40 wt %, or from 15 to 35 wt %, or from 20 to 30 wt %, based on the sum weight of the polypropylene homopolymer and the impact modified propylene-based polymer.

An impact modified propylene-based polymer may comprise a combination of two or more embodiments as described herein.

In one embodiment, the composition has a shear viscosity in the range from 500 to 700 Pa-s, at a temperature from 220 to 230° C., and a shear rate from 50 to 150 s-1.

In on embodiment, the composition has a shear stress from 45 to 55 kPa, at a temperature from 220 to 230° C., and a shear rate from 50 to 150 s-1.

In one embodiment, the composition has a loss modulus less than, or equal to, 25 kPa at 150 s-1.

In one embodiment, the composition has a loss modulus less than, or equal to, 15 kPa, at a shear rate less than, or equal to, 20 s-1.

In one embodiment, the composition has a storage modulus from 1300 to 1600 Pa, at a temperature from 230 to 220° C.

In one embodiment, the composition has a loss modulus from 3400 to 3900 Pa, at a temperature from 230 to 220° C.

In one embodiment, the composition has a storage modulus from 1300 to 1600 Pa, and a loss modulus from 3400 to 3900 Pa, at a temperature from 230 to 220° C.

In one embodiment, the composition has a stress relaxation time less than, or equal to, 1.2 seconds, to relax ⅔ (or 1/e) of the initial stress.

In one embodiment, the composition further comprises at least one additive. In a further embodiment, the additive is selected from antioxidants, ultraviolet light absorbers, anti-static agents, pigments, dyes, nucleating agents, fillers, slip agents, fire retardants, plasticizers, anti-blocking agents, or combinations thereof.

A composition can be made by a variety of methods. For example, it may be made by blending or mixing polymer components, or by melt blending the individually melted components. Alternatively, it may be made in situ, in one or more polymerization reactors.

An inventive composition may comprise a combination of two or more embodiments as described herein.

In one embodiment, the article is stretched after being compressed.

In one embodiment, the article is a compression, stretch, blow formed article

In one embodiment, the article is a container. In a further embodiment, the article is a bottle.

An inventive article may comprise a combination of two or more embodiments as described herein.

Polypropylene Homopolymer (Component 1)

In one embodiment, the polypropylene homopolymer has a melt flow index (MFI) from 0.5 to 10 g/10, or from 1 to 7 g/10 min, or from 2 to 4 g/10 min.

In one embodiment, the polypropylene homopolymer has a weight average molecular weight (Mw) greater than, or equal to, 30,000 g/mole, or greater than, or equal to, 50,000 g/mole, or greater than, or equal to, 75,000 g/mole, or greater than, or equal to, 100,000 g/mole, as determined by GPC.

In one embodiment, the polypropylene homopolymer has a weight average molecular weight (Mw) less than, or equal to, 1,000,000 g/mole, or less than, or equal to, 800,000 g/mole, or less than, or equal to, 500,000 g/mole, as determined by GPC.

In one embodiment, the polypropylene homopolymer has a weight average molecular weight (Mw) from 30,000 and 1,000,000 g/mole, as determined by GPC. It is understood that the limits on the minimum and maximum Mw is set by practical considerations.

In one embodiment, the polypropylene homopolymer has a molecular weight distribution (Mw/Mn) from 1.5 to 3, or from 2 to 3, as determined by GPC.

The polypropylene homopolymer may comprise a combination of two or more embodiments as described herein.

Random Propylene-Based Interpolymer (Component A)

In one embodiment, the random propylene-based interpolymer is a propylene/α-olefin interpolymer, and preferably a propylene/α-olefin copolymer, or a propylene/ethylene interpolymer, and preferably a propylene/ethylene copolymer. In a further embodiment, the α-olefin is a C4-C20 α-olefin, or a C4-C10 α-olefin. In a further embodiment, the α-olefin is selected from the group consisting of 1-butene, 1-pentene, 1-hexene, 1-heptene, 1-octene and 1-butene, 1-nonene, 1-decene, 4-methyl-1-pentene and mixtures thereof.

In one embodiment, the random propylene-based interpolymer has a molecular weight distribution, Mw/Mn, from 2 to 10, or from 2. to 5, or from 2 to 3.

In one embodiment, the random propylene-based interpolymer comprises propylene, and typically, ethylene and/or one or more unsaturated comonomers, and is characterized as having at least one, preferably more than one, of the following properties: (i) 13C NMR peaks corresponding to a regio-error at about 14.6 and about 15.7 ppm, the peaks of about equal intensity, (ii) a skewness index, $S_{ix}$, greater than about −1.20, (iii) a DSC curve with a $T_{me}$ that remains essentially the same, and a $T_{Max}$ that decreases as the amount of comonomer (i.e., units derived from ethylene and/or the unsaturated comonomer(s)) in the interpolymer is increased, and (iv) an X-ray diffraction pattern that reports more gamma-form crystals than a comparable interpolymer prepared with a Ziegler-Natta catalyst. In a further embodiment, the propylene-based interpolymer is a propylene/ethylene interpolymer, and preferably a propylene/ethylene copolymer. It is noted that in property (i) the distance between the two 13C NMR peaks is about 1.1 ppm. Suitable interpolymers are described in U.S. Pat. No. 6,919,407, incorporated herein by reference.

In one embodiment, the random propylene-based interpolymer is characterized by at least one, preferably at least two, more preferably at least three, and even more preferably all four, of these properties.

With respect to the X-ray property of subparagraph (iv) above, a "comparable" interpolymer is one having the same monomer composition within 10 weight percent, and the same $M_w$ (weight average molecular weight) within 10 weight percent. For example, if an inventive propylene/ethylene/1-hexene interpolymer is 9 weight percent ethylene and 1 weight percent 1-hexene, and has a Mw of 250,000, then a comparable polymer would have from 8.1 to 9.9 weight percent ethylene, from 0.9 to 1.1 weight percent 1-hexene, and a Mw from 225,000 to 275,000, and prepared with a Ziegler-Natta catalyst.

In one embodiment, the random propylene-based interpolymer has a molecular weight distribution (Mw/Mn) from 1.5 to 6, or from 2 to 5, or from 3 to 5, or from 4 to 5.

In one embodiment, the random propylene-based interpolymer is characterized as having substantially isotactic propylene sequences. "Substantially isotactic propylene sequences," and similar terms, mean that the sequences have an isotactic triad (mm) measured by 13C NMR of greater than about 0.85, preferably greater than about 0.90, more preferably greater than about 0.92, and most preferably greater than about 0.93. Isotactic triads are well known in the art, and are described in, for example, U.S. Pat. No. 5,504,172, and International Publication No. WO 00/01745, which refers to the isotactic sequence in terms of a triad unit in the copolymer molecular chain determined by 13C NMR spectra.

The random propylene-based interpolymer includes, but is not limited to, a propylene/ethylene copolymer, propylene/ethylene/1-butene terpolymer, propylene/ethylene/ENB terpolymer, propylene/ethylene/1-hexene terpolymer, propylene/ethylene/1-octene terpolymer, propylene/1-hexene copolymer, propylene/1-pentene copolymer, propylene/1-nonene copolymer, propylene/1-decene copolymer, propylene/1-heptene copolymer, propylene/4-methyl-1-pentene copolymer and propylene/1-butene copolymer. Suitable propylene-base interpolymers include VERSIFY Plastomers and Elastomers (available from The Dow Chemical Company). In a preferred embodiment, the random propylene-based interpolymer is a propylene/ethylene interpolymer, and preferably a propylene/ethylene copolymer.

In one embodiment, the random propylene-based interpolymer has a melt flow rate (MFR) greater than, or equal to, 0.3, or greater than, or equal to 1 g/10 min. The MFR is measured according to ASTM D-1238 (2.16 kg, 230° C.).

In one embodiment, the random propylene-based interpolymer has a melt flow rate (MFR) less than, or equal to, 20, or less than, or equal to 10, or less than, or equal to 5 g/10 min, or less than, or equal to 3 g/10 min. The MFR is measured according to ASTM D-1238 (2.16 kg, 230° C.).

A random propylene-based interpolymer may comprise a combination of two or more embodiments as described herein.

Long Chain-Branched Propylene-Based Interpolymer (Component B)

In one embodiment, the long chain branched propylene-based polymer has a melt flow rate (MFR) greater than, or equal to, 0.2 g/10 min, or greater than, or equal to, 0.3 g/10 min. The MFR is measured according to ASTM D-1238 (2.16 kg, 230° C.).

In one embodiment, the long chain branched propylene-based interpolymer has a melt flow rate (MFR) less than, or equal to, 20, or less than, or equal to 10, or less than, or equal to 5 g/10 min, or less than, or equal to 3 g/10 min. The MFR is measured according to ASTM D-1238 (2.16 kg, 230° C.).

In one embodiment, the long chain branched propylene-based interpolymer has a molecular weight distribution less than, or equal to, 5, or less than, or equal to, 4.5, or less than, or equal to 4, as determined by GPC.

In one embodiment, the long chain branched propylene-based interpolymer has a molecular weight distribution is greater than, or equal to, 1.2, or greater than, or equal to, 1.5, or greater than, or equal to 2, as determined by GPC.

In one embodiment, the long chain branched propylene-based interpolymer, and preferably a copolymer, comprises the following: (A) at least 60 weight percent (wt %) units derived from propylene (based on the total weight of polymer), and (B) from greater than zero to 40 wt % units derived from ethylene (based on the total weight of polymer). The propylene-based inter polymer is further characterized by at least one of the following properties: (1) a g' ratio of less than 1, preferably less than 0.95, more preferably less than 0.85 and even more preferably less than 0.80, measured at polymer number average molecular weight (Mn), (2) a relative compositional drift of less than 50%, and (3) propylene chain segments having a chain isotacticity triad index of at least 70 mole percent. Such an interpolymer is described in International Publication No. WO 2009/067337, incorporated herein by reference.

In one embodiment, the long chain branched propylene-based interpolymer, and preferably a copolymer, is characterized by at least two of properties (1), (2) and (3), for example, (1) and (2), or (1) and (3), or (2) and (3). In another embodiment, the propylene-based interpolymer is characterized by properties (1), (2) and (3).

In one embodiment, the long chain branched propylene-based interpolymer, and preferably a propylene/ethylene interpolymer, is characterized by at least one of the following properties:
 (a) a weight average molecular weight (Mw) of at least 50,000 grams per mole (g/mol);
 (b) an Mw/Mn of less than 4;
 (c) a critical shear rate at the onset of surface melt fracture (OSMF) of at least 4,000 sec-1;
 (d) an I10/I2 at 230° C. greater than or equal to ($\geq$) 5.63;
 (e) a nominal weight percent crystallinity from greater than 0 to 40 wt %; and, preferably,
 (f) a single melting point as measured by differential scanning calorimetry (DSC).

Such a propylene-based interpolymer is described in WO 2009/067337, incorporated herein by reference.

In one embodiment, the long chain branched propylene-based interpolymer, and preferably a propylene/ethylene interpolymer, preferably a copolymer, is further characterized by at least one of (b) through (f).

In one embodiment, the long chain branched propylene-based interpolymer, and preferably a propylene/ethylene interpolymer, preferably a copolymer, is further characterized by at least one of (c) through (f).

In one embodiment, the long chain branched propylene-based interpolymer, and preferably a propylene/ethylene interpolymer, preferably a copolymer, is further characterized by at least one of (d) through (f).

In one embodiment, the long chain branched propylene-based interpolymer, and preferably a propylene/ethylene interpolymer, preferably a xopolymer, is further characterized by at least one of (e) and (f).

In one embodiment, the long chain branched propylene-based interpolymer, and preferably a propylene/ethylene interpolymer, preferably a copolymer, is further characterized by at least one of (a), (b), (d), (e), and (f).

In one embodiment, the long chain branched propylene-based interpolymer is characterized as comprising the following: (A) from 60 to less than 100 weight percent, preferably from 80 to 99 weight percent, and more preferably from 85 to 99 weight percent, units derived from propylene (based on the total weight of the polymer), and (B) from greater than zero to 40 weight percent, preferably from 1 to 20 weight percent, more preferably from 2 to 16 weight percent, and even more preferably from 3 to 10 weight percent, units derived from at least one of ethylene and/or a C4-30 α-olefin (based on the total weight of the polymer). The polymer further contains an average of at least 0.001, preferably an average of at least 0.005 and more preferably an average of at least 0.01, long chain branches/1000 total carbons. The maximum number of long chain branches typically does not exceed 3 long chain branches/1000 total carbons. Such a propylene-based interpolymer is described in WO 2009/067337, incorporated herein by reference.

Long chain-branched propylene-based interpolymers include, but are not limited to, a propylene/ethylene copolymer, propylene/ethylene/1-butene terpolymer, propylene/ethylene/ENB terpolymer, propylene/ethylene/1-hexene terpolymer, propylene/ethylene/1-octene terpolymer, propylene/1-hexene copolymer, propylene/1-pentene copolymer, propylene/1-nonene copolymer, propylene/1-decene copolymer, propylene/1-heptene copolymer, propylene/4-methyl-1-pentene copolymer and propylene/1-butene copolymer. In a preferred embodiment, the propylene-based polymer is a propylene/ethylene interpolymer, and preferably a propylene/ethylene copolymer.

Suitable α-olefins include, but are not limited to, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, and vinylcyclohexane.

In one embodiment, the long chain branched propylene-based interpolymer has an I10/I2 at 230° C. (as determined by ASTM D-1238) greater than or equal to (≥) 5.63, preferably from 6.5 to 15, and more preferably from 7 to 10. The molecular weight distribution (Mw/Mn or MWD), measured by gel permeation chromatography (GPC), is defined by the equation: Mw/Mn≤(I10/I2)−4.63, and is preferably from 1.5 to 2.5. The I10/I2 ratio indicates the degree of long chain branching, i.e., the larger the I10/I2 ratio, the more long chain branching in the polymer.

Such propylene-based polymers have a highly unexpected flow property, where the I10/I2 value at 230° C. of the polymer is essentially independent of the polydispersity index (i.e., Mw/Mn) of the polymer. This is contrasted with linear propylene-based polymers having rheological properties, such that, to increase the I10/I2 value, the polydispersity index must also be increased.

In one embodiment, the molecular weight distribution (MWD or Mw/Mn) of the log chain branched propylene interpolymers is less than 4, or less than 3.5, or less than 3.

In one embodiment, the density of these polymers (as determined by ASTM D-792, Method B) is from 0.85 to 0.90, or from 0.855 to 0.895, or from 0.86 to 0.89 g/cc (1 cc=1 cm³). See WO 2009/067337, incorporated herein by reference.

The g' ratio is the ratio of the intrinsic viscosity value for the branched propylene-based polymer, and for example, a propylene/ethylene copolymer divided by the intrinsic viscosity value for the linear propylene-ethylene copolymer having similar ethylene content, i.e., polymer density, and similar molecular weight, i.e., melt flow rate. "Similar" means within twenty percent (20%) of each value. These g' ratios are calculated at the number average molecular weight ($M_n$) and weight average molecular weight values ($M_w$).

$$g'=(IV\text{branched}/IV\text{linear})$$

The IV values are obtained at $M_n$ and $M_w$ values. See WO 2009/067337, incorporated herein by reference.

Such a propylene-based polymer is further characterized as having a resistance to melt fracture. An "apparent shear stress versus apparent shear rate" plot is used to identify the melt fracture phenomena. According to Ramamurthy, in the Journal of Rheology, 30(2), 337-357, 1986, above a certain critical flow rate, the observed extrudate irregularities may be broadly classified into two main types: surface melt fracture and gross melt fracture. Surface melt fracture occurs under apparently steady flow conditions, and ranges in detail from loss of specular film gloss to the more severe form of "sharkskin." The onset of surface melt fracture (OSMF) is characterized at the beginning of losing extrudate gloss, at which the surface roughness of the extrudate can be detected by 40 times magnification. See WO 2009/067337, incorporated herein by reference.

Differential scanning calorimetry (DSC) is a common technique that can be used to examine the melting and crystallization of semi-crystalline polymers. General principles of DSC measurements and applications of DSC to studying semi-crystalline polymers are described in standard texts (for instance, E. A. Turi, ed., "Thermal Characterization of Polymeric Materials", Academic Press, 1981).

Compositional Drift Analysis

The GPC-FT/IR technique allows for the measurement of fractional polymer compositions as a function of polymer molecular weight. This characterization technique utilizes gel permeation chromatography (GPC) coupled with Fourier Transform Infrared Spectroscopy (FT/IR). For this analysis, a Waters high temperature GPC unit (#150C) is coupled to a Magna System 560 FT/IT (Water Corp, Milford, Mass.). The mobile phase or solvent is tetrachloroethylene. The following references described this technique.

P. J. Deslauriers, D. C. Rohlfing, E. T. Hsieh, "Quantifying Short Chain Branching in Ethylene 1-Olefin Copolymers using Size Exclusion Chromatography and Fourier Transform Infrared Spectroscopy," Polymer, 43, 159-170 (2002).

R. P. Markovich, L. G. Hazlitt, L. Smith, ACS Symposium Series: Chromatography of Polymers, 521, 270-276 (1993). The samples are dissolved in tetrachloroethylene and analyzed on the GPC-FT/IR. The samples are separated by molecular weight fraction, and, as these fractions elute, they are analyzed by the FT/IR. For propylene-based polymers, the infrared spectral region from 2750 to 3050 $cm^{-1}$ is obtained as a function of molecular weight. Within this spectral region, the partial absorbance area at greater than 2940 $cm^{-1}$ is used for the methyl content. From these measurements, one skilled in the art can develop ethylene content calibration curves for comparing the compositional drift of the samples versus the molecular weight distribution. The compositional drift is calculated as the weight percent ethylene content at the 90% cumulative GPC fraction, and at the 10% cumulative GPC fraction. These two ethylene values are subtracted and the result is then divided by the weight percent ethylene content of the sample. See WO 2009/067337, incorporated herein by reference.

A chain branched propylene-based interpolymer may comprise a combination of two or more embodiments as described herein.

Azide Coupled Propylene-Based Polymer

An azide compound contains at least one $N_3$ moiety, and preferably at least two, $N_3$ moieties. Azide compounds include polyfunctional sulfonyl azides, as disclosed in U.S. Pat. No. 6,521,306, incorporated herein by reference. Preferred polyfunctional sulfonyl azides have at least two sulfonyl azide groups (—$SO_2N_3$) reactive with the polyolefin. In one embodiment, the polyfunctional sulfonyl azide has a structure X—R—X, wherein each X is $SO_2N_3$, and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently, to permit a facile reaction between the polyolefin and the polyfunctional sulfonyl azide.

Polyfunctional sulfonyl azide materials include such compounds as 1,5-pentane bis(sulfonyl azide); 1,8-octane bis(sulfonyl azide); 1,10-decane bis(sulfonyl azide); 1,10-octadecane bis(sulfonyl azide); 1-octyl-2,4,6-benzene tris(sulfonyl azide); 4,4'-diphenyl ether bis(sulfonyl azide); 1,6-bis(4'-sulfonazidophenyl)hexane; 2,7-naphthalene bis(sulfonyl azide);

and mixed sulfonyl azides of chlorinated aliphatic hydrocarbons containing an average of from 1 to 8 chlorine atoms and from 2 to 5 sulfonyl azide groups per molecule; and mixtures thereof. Preferred polyfunctional sulfonyl azide materials include oxy-bis(4-sulfonylazidobenzene); 2,7-naphthalene bis(sulfonyl azido); 4,4'-bis(sulfonyl azido)biphenyl; 4,4'-diphenyl ether bis(sulfonyl azide) (also known as diphenyloxide-4,4'-disulfonylazide; and bis(4-sulfonyl azidophenyl)methane; and mixtures thereof. Most preferred is diphenyloxide-4,4'-disulfonylazide (designated DPO-BSA herein).

Sulfonyl azides are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used. Polyfunctional sulfonyl azides are also described in U.S. Pat. No. 6,776,924, fully incorporated herein by reference.

For rheology modification, the polyfunctional sulfonyl azide is admixed with the polymer, and heated to at least the decomposition temperature of the polyfunctional sulfonyl azide. By decomposition temperature of the polyfunctional sulfonyl azide, it is meant that temperature at which the polyfunctional sulfonyl azide converts to the sulfonyl nitrene, eliminating nitrogen and heat in the process, as determined by DSC. In one embodiment, the polyfunctional sulfonyl azide begins to react at a kinetically significant rate (convenient for use in the practice of the invention) at temperatures of about 130° C., and is almost completely reacted at about 160° C. in a DSC (scanning at 10° C./min). Onset of decomposition was found to be about 100° C. by Accelerated Rate calorimetry (ARC) scanning at 2° C./hr. Extent of reaction is a function of time and temperature.

Temperatures for use in the practice of the invention are also determined by the softening or melt temperatures of the polymer starting materials. In one embodiment, the temperature is greater than 90° C., or greater than 120° C., or greater than 150° C., or greater than 180° C. Preferred reaction times at the desired decomposition temperatures, are times that are sufficient to result in reaction of the azide compound with the polymer(s), without undesirable thermal degradation of the polymer matrix.

Admixing of the polymer and azide compound is accomplished by any means within the skill in the art. Desired distribution is different in many cases, depending on what rheological properties are to be modified. It is desirable to have as homogeneous a distribution as possible, preferably achieving solubility of the azide in the polymer melt.

The term "melt processing" is used to mean any process in which the polymer is softened or melted, such as extrusion, pelletizing, film blowing and casting, thermoforming, compounding in polymer melt form, and other melt processes.

The polymer and azide compound are suitably combined in any manner which results in desired reaction thereof, preferably by mixing the azide compound with the polymer(s) under conditions which allow sufficient mixing before reaction, to avoid uneven amounts of localized reaction, and then subjecting the resulting admixture to heat sufficient for reaction.

Any equipment is suitably used; preferably equipment which provides sufficient mixing and temperature control in the same equipment. Preferably, a continuous polymer processing system, such as an extruder, or a semi-continuous polymer processing system, such as a BANBURY mixer, is used. For the purposes of this invention, the term extruder is used, for its broadest meaning, to include such devices as a device which extrudes pellets, as well as devices in which the polymeric material is extruded in the form of sheets or other desired shapes and/or profiles.

Extruders and processes for extrusion are described in U.S. Pat. Nos. 4,814,135; 4,857,600; 5,076,988; and 5,153,382 (each incorporated herein by reference). Examples of various extruders, which can be used in forming pellets are single screw and multi-screw types. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase, to avoid later steps for removal of the solvent or other medium. For this purpose, a polymer above the crystalline melt temperature is advantageous for even mixing, and for reaching a reaction temperature (the decomposition temperature of the azide compound).

In a preferred embodiment, the azide modified polymers are substantially gel free. In order to detect the presence of, and where desirable, quantify, insoluble gels in a polymer composition, the composition is soaked in a suitable solvent, such as refluxing xylene, for 12 hours, as described in ASTM D 2765-90, Method B. Any insoluble portion of the composition is then isolated, dried and weighed, making suitable corrections based upon knowledge of the composition. For example, the weight of "non-polymeric, solvent-soluble components" is subtracted from the initial weight; and the weight of "non-polymeric, solvent-insoluble, components" is subtracted from both the initial and final weight. The insoluble polymer recovered is reported as "percent gel" content (based on the weight of the composition). For purposes of this invention, "substantially gel free" means a percent gel content that is less than 10 percent, preferably less than 8 percent, more preferably less than 5 percent, even more preferably less than 3 percent, still more preferably less than 2 percent, even more preferably less than 0.5 percent, and most preferably below detectable limits, when using xylene as the solvent. For certain end use applications where gels can be tolerated, the percent gel content can be higher.

Preferably the inventive compositions do not contain peroxides and/or other types of coupling agents. Examples of other types of coupling agents include phenols, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, elemental sulfur, paraquinonedioxime, dibenzoparaquinonedioxime; or combinations thereof.

Impact Modified Propylene-Based Polymer (Component D)

In one embodiment the impact modified propylene-based polymer is a heterophasic propylene copolymer, where polypropylene is the continuous phase and an elastomeric phase is uniformly dispersed therein. The impact polymers are formed from an in-reactor process rather than physical blending. Usually the impact polymers are formed in a dual or multi-stage process, which optionally involves a single reactor with at least two process stages taking place therein, or optionally multiple reactors. Advantageously, the impact copolymers have at least about 5 weight percent, preferably at least about 10, preferably up to about 40, more preferably up to about 35 weight percent, further more preferably up to about 25 weight percent, and most preferably up to about 20 weight percent, ethylene. Examples of some suitable impact polypropylene polymers are disclosed in U.S. Pat. No. 6,593,005, to Tau et al., which is incorporated herein by reference.

In one embodiment the impact modified propylene-based polymer is a heterophasic propylene copolymer, where polypropylene is the continuous phase and an elastomeric phase is uniformly dispersed therein.

DEFINITIONS

The term "polymer" is used herein to indicate, a homopolymer (employed to refer to polymers prepared from one type of monomer, with the understanding that trace amounts of impurities can be incorporated into the polymer structure), and an interpolymer, as described herein.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "propylene-based polymer," as used herein, refers to a polymer that comprises, in polymerized form, a majority weight percent propylene (based on the weight of the polymer), and, optionally, one or more additional comonomers.

The term "propylene-based interpolymer," as used herein, refers to an interpolymer that comprises, in polymerized form, a majority weight percent propylene (based on the weight of the interpolymer), and one or more additional comonomers.

The term "propylene/α-olefin interpolymer," as used herein, refers to an interpolymer that comprises, in polymerized form, a majority weight percent propylene (based on the weight of the interpolymer), an α-olefin, and optionally, one or more additional comonomers.

The term "propylene/α-olefin copolymer," as used herein, refers to a copolymer that comprises, in polymerized form, a majority weight percent propylene (based on the weight of the copolymer), and an α-olefin, and no other comonomers.

The term "propylene/ethylene interpolymer," as used herein, refers to an interpolymer that comprises, in polymerized form, a majority weight percent propylene (based on the weight of the interpolymer), ethylene, and optionally, one or more additional comonomers.

The term "propylene/ethylene copolymer," as used herein, refers to a copolymer that comprises, in polymerized form, a majority weight percent propylene (based on the weight of the copolymer), and ethylene, and no other comonomers.

The term "coupling amount," as used herein, refers to an amount of the one or more azide compounds that is effective in coupling polymer chains, and results in a "substantially gel free" composition as defined above.

The term "random propylene-based interpolymer," as used herein, refers to an interpolymer, in which the comonomer(s) is/are randomly distributed (no order, disorder) along the polymer chains.

The terms "blend" or "polymer blend," as used herein, refers to a mixture of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary.

In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density—is measured in accordance with ASTM D792-08, Method B.

Melt Flow Rate (MFR)—is measured in accordance with ASTM D 1238-10 at 230° C. with a 2.16 kg weight for propylene-based polymers.

Dynamic Mechanical Thermal Analysis (DMTA)—This test provides information about the small strain shear response as a function of temperature.

A. Sample Preparation

Specimens for dynamic mechanical thermal analysis are prepared on a programmable Tetrahedron bench top press. The program holds the melt at 180° C. for 5 minutes at a pressure of 107 Pa. The chase is then removed to the bench top to cool down to room temperature. Round test specimens are then die-cut from the plaque using a punch press and a hand-held die with a diameter of 25 mm. The specimen is about 3.5 mm thick.

B. Thermoforming Test

In the thermoforming test, the Storage Modulus (G') is obtained from dynamic mechanical thermal analysis with an ARES rheometer, using "25 mm" parallel plates, at a gap of 2.0 mm, at a constant frequency of 10 rad/s and strain of 1%, under an inert nitrogen atmosphere. During testing, the temperature was decreased from 230° C. to below crystallization temperature at a cooling rate of 2° C./min.

C. Dynamic Shear Viscosity

The dynamic shear viscosity as a function of frequency was determined by small-amplitude oscillatory shear rheology. An ARES rheometer with parallel plates sample fixture was used. Testing was performed at three temperatures (190° C., 210° C. and 230° C.). Samples were subjected to an oscillatory shear stress, at a nominal amplitude of 100 Pa, by oscillating the upper plate at a fixed frequency, and the resultant strain was measured. The auto-stress adjustment capability was utilized to keep the strain within limits of 1-30% (stress adjustment setting=32% of current stress, maximum stress=100 Pa). These conditions ensure that each material was characterized within its linear viscoelastic region. The dynamic shear viscosity was calculated from the measured strain and applied stress as a function of frequency. Frequency sweeps were conducted starting at 500 rad/s and decreasing to 0.02 rad/s, using a logarithmic sweep mode with six points per decade.

The output of these experiments is the storage modulus (G') and loss modulus (G"). The storage modulus measures the elastic response or the ability of the material to store energy, and the loss modulus measures the viscous response or the ability of the material to dissipate energy. Tan δ is the ratio of G"/G', and gives a measure of the damping ability of the material.

The dynamic shear viscosity ($\eta^*$) versus frequency ($\omega$) curves were fitted using the Cross model (as described in C. W. Macoskco, "Rheology: Principles, Measurements, and Applications", Wiley-VCH, 1994):

The three parameters in this model are: $\eta_0$, the zero-shear viscosity; $\lambda$, the average relaxation time; and n, the power law exponent. The zero-shear viscosity is the value at a plateau in the Newtonian region of the flow curve at a low frequency, where the dynamic shear viscosity is independent of frequency. The average relaxation time corresponds to the inverse of the frequency at which shear-thinning starts. The power law exponent n is the slope of the shear thinning region at high shear rates in a log-log plot of "dynamic shear viscosity versus frequency." These parameters provide a means to compare the effect of plasticization on a material's flow behavior, sensitivity to shear, and molecular structure.

Gel Permeation Chromatography (GPC)

The molecular weight distribution of the polymers is determined using gel permeation chromatography (GPC) on a Polymer Laboratories PL-GPC-220 high temperature chromatographic unit, equipped with four linear mixed bed columns (Polymer Laboratories (20-micron particle size)). The oven temperature is at 160° C., with the autosampler hot zone at 160° C., and the warm zone at 145° C. The solvent is 1,2,4-trichlorobenzene containing "200 ppm 2,6-di-t-butyl-4-methylphenol." The flow rate is 1.0 milliliter/minute, and the injection size is 100 microliters. About 0.2% by weight solutions of the samples are prepared for injection, by dissolving the sample in nitrogen purged 1,2,4-trichlorobenzene containing "200 ppm 2,6-di-t-butyl-4-methylphenol" for 2.5 hrs at 160° C., with gentle mixing.

The molecular weight determination is deduced by using ten narrow molecular weight distribution polystyrene standards (from Polymer Laboratories, EasiCal PSI ranging from 580-7,500,000 g/mole) in conjunction with their elution volumes. The equivalent molecular weights for the polymer of interest are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$$K_{PS}M_{PS}{}^{a_{PS}}K_{PP}M_{PP}{}^{a_{PP}}$$

where M is the molecular weight and the Mark-Houwink coefficients for the PP and PS are $K_{PP}$=1.90E-04, $a_{PP}$=0.725, and $K_{PS}$=1.26E-04, $a_{PS}$=0.702.

From the measured molecular weight distribution, the number average molecular weight (Mn) and the weight average molecular weight (Mw) can be calculated from the following equations:

$$Mn = \frac{\sum_i N_i M_i}{\sum_i N_i}, \text{ and}$$

$$Mw = \frac{\sum_i N_i M_i^2}{\sum_i N_i M_i},$$

where $N_i$ is the number of molecules of molecular weight M. The $M_n$, $M_w$ and $M_w/M_n$ values are generated by the GPC software.

EXPERIMENTAL

One main advantage for bottles and containers formed from propylene-based polymers, and fabricated using a Compression Blow Forming (CBF) process, is their much lower specific gravity compared to any bottles and containers formed from competitive resins and processes. Furthermore, bottles and containers formed from propylene-based polymer can meet the requirements of the hot fill and aseptic packaging processes, and the requirements of post-pasteurization processes.

Processing propylene-based polymers by CBF is a challenge due to the crystalline nature of these polymers. As shown in Table 1, the fast crystallization of the propylene-based polymer (PP), results in a sharp change of viscosity, storage modulus and melt strength.

TABLE 1

Crystallization Growth Rates

| Polymer | nm/s |
|---|---|
| PE | 100,000 |
| PP | 10,000 |
| PET | 1,000 |
| PS | 0.3 |

FIG. 1 shows the storage modulus as a function of temperature for HIPS, HDPE and hPP. The data was obtained by Dynamic Mechanical Analysis (DMA) on a molten polymer sample, held between two parallel plates, and subject to a at a fix frequency while the temperature is at a fix cooling rate. It can be seen that for an amorphous polymer, such as the HIPS (PS), the increase in the storage modulus with the decrease in temperature is gradual, and this profile type gives a broad range of temperature for the stretching and blowing stages of this polymer in a CBF process.

As shown in FIG. 1, the PP and HDPE changes in storage modulus (G') are very sharp, not showing much strain hardening. Thus the melt strength for each of these polymers will be mainly a function of shear viscosity only (Trouton rule states that elongational viscosity is three times shear viscosity).

At too high temperatures, polyolefin (HDPE or PP) lack melt strength, which makes it impossible to stretch and blow. When the temperature is decreased, an extremely rapid increase of melt strength, as indicated by increase in storage modulus, is found, which makes it difficult to control the stretch/blowing process of these polymers. For PP, the rate of change of the melt strength as a function of temperature is much faster than in PS, as depicted by the much steeper slope in FIG. 1, as well as the narrow melt strength temperature range, as indicated by the narrow temperature range for a high storage modulus.

Composition containing propylene-based polymers are needed that withstand the sheared forces and strained under each step of a CBF process, to ensure less elastic properties during the cutting step, and more elastic during crystallization, and thus broadening the processing window of the stretch-blow step. These characteristics are not present in the PP resins currently on the market. It has been discovered that compositions comprising a polypropylene homopolymer and at least one other propylene-based polymer, as claimed, are well suited for CBF applications.

Although the invention has been described in considerable detail, this detail is for the purpose of illustration and is not to be construed as a limitation on the scope of the invention as described in the pending claims.

The invention claimed is:

1. A compression blow formed article formed from a composition comprising at least the following: 1) a polypropylene homopolymer having a melt flow index (MFI) from 0.5 to 10 g/10 min and 2) an azide coupled long chain branched random propylene-based interpolymer or azide coupled long chain branched random propylene-based copolymer in an amount from 5 to 35 wt % based on the total weight the composition, having a melt flow rate (MFR) from 0.3 to 10 g/10 min, and having a melt flow index (MFI) from 0.2 to 5 g/10 min.

2. The article of claim 1, wherein the polypropylene homopolymer has a melt flow index (MFI) from 1 to 7 g/10 min.

3. The article of claim 1, wherein the azide coupled long chain branched random propylene-based interpolymer or azide coupled long chain branched random propylene-based copolymer has a melt flow rate (MFR) from 0.5 to 7 g/10 min.

4. The article of claim 1, wherein the azide coupled long chain branched random propylene-based interpolymer or azide coupled long chain branched random propylene-based copolymer is present in an amount from 70 to 80 wt %, based on the weight of the composition.

5. The article of claim 1, wherein the azide coupled long chain branched propylene-based interpolymer has a melt flow index (MFI) from 0.3 to 3 g/10 min.

6. The article of claim 1, wherein the azide coupled long chain branched propylene-based polymer has a melt flow index (MFI) from 1 to 3 g/10 min.

7. The article of claim 1, wherein the azide coupled long chain branched propylene-based polymer is present in an amount from 10 to 30 wt % based on the total weight of the composition.

8. The article of claim 1, wherein the article is stretched after being compressed.

9. The article of claim 1, wherein the polypropylene homopolymer has a melt flow index (MFI) from 2 to 4 g/10 min.

10. The article of claim 1, wherein the azide long chain branched coupled propylene-based polymer has a melt flow rate (MFR) from 1 to 3 g/10 min.

11. The article of claim 1, wherein the azide coupled long chain branched propylene-based polymer is present in an amount from 20 to 30 wt %, based on the total weight of the composition.

* * * * *